A. L. BLACK.
NOVELTY ILLUSION.
APPLICATION FILED MAY 31, 1910.

984,414.

Patented Feb. 14, 1911.

Witnesses
H. A. Stock.
H. C. Schroeder.

Inventor
Archie L. Black.
By E. E. Vrooman
Attorney

THE NORRIS PETERS CO., WASHINGTON, D. C.

UNITED STATES PATENT OFFICE.

ARCHIE L. BLACK, OF OAKLAND, CALIFORNIA.

NOVELTY ILLUSION.

984,414.  Specification of Letters Patent.  Patented Feb. 14, 1911.

Application filed May 31, 1910. Serial No. 564,204.

*To all whom it may concern:*

Be it known that I, ARCHIE L. BLACK, a citizen of the United States, residing at Oakland, in the county of Alameda and State of California, have invented certain new and useful Improvements in Novelty Illusions, of which the following is a specification, reference being had therein to the accompanying drawing.

This invention relates to amusement devices, and the principal object of the same is to provide simple means that are used in connection with a person's hand to simulate a human face.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1:
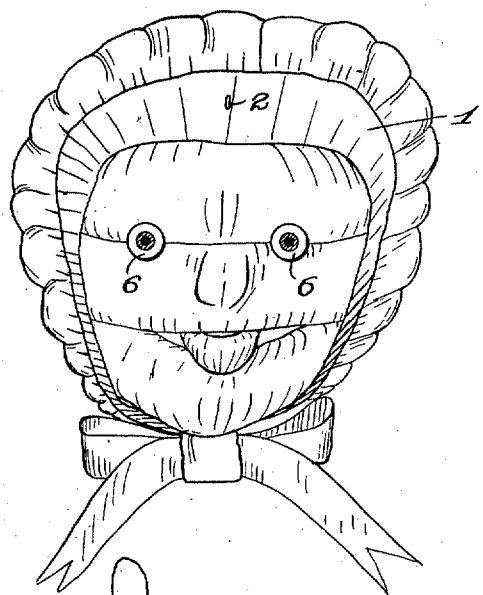
Figure 2:
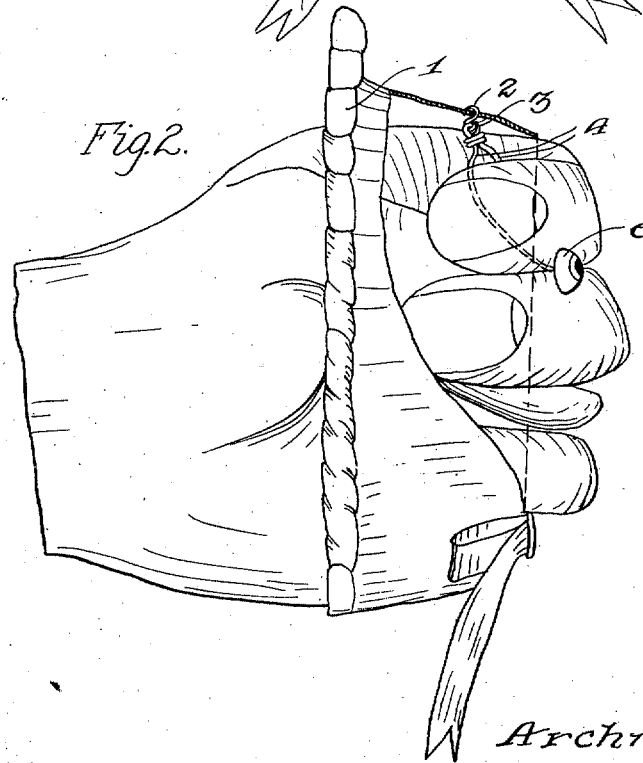
Figure 3:
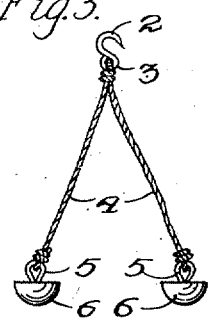

Figure 1 is a view in front elevation of the improved portraying means. Fig. 2 is a side view thereof. Fig. 3 is a detail view of the means that are employed for simulating an eye.

Referring to the accompanying drawings by numerals, 1 designates the body of the device which may be a handkerchief and which is arranged around the clenched hand to represent a bonnet or which may be a suitably shaped piece of material provided with an opening through which the joints of the fingers project. A hook 2 is attached to the upper portion of the body 1 and is provided with an eye 3 to which the cords 4 are attached, the free ends of said cords being attached to the shanks 5 of the buttons 6. Said buttons are preferably of the shoe button type and may be suitably marked to simulate human eyes.

In using the device, the body 1 is arranged about the clenched hand to simulate a bonnet and the buttons 6 are held between the first and second finger so that they will simulate eyes. The thumb is projected between the second and third finger, and the result is a comical simulation of an old woman with her tongue protruding, as clearly shown in Fig. 1.

What I claim as my invention is:—

The combination with a bonnet simulating hood, of a hook secured within said hood and the free end of said hook formed into an eye, a cord secured intermediate its length to said eye, and eye simulating means secured to the free ends of said cord.

In testimony whereof I hereunto affix my signature in presence of two witnesses.

ARCHIE L. BLACK.

Witnesses:
H. C. SCHROEDER,
F. P. SCHROEDER.